March 8, 1949.　　　G. C. BARKER　　　2,464,067
CAMOUFLAGED CAMERA
Filed Aug. 16, 1944　　　2 Sheets-Sheet 1
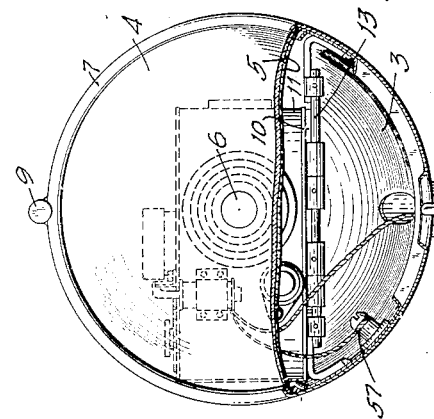
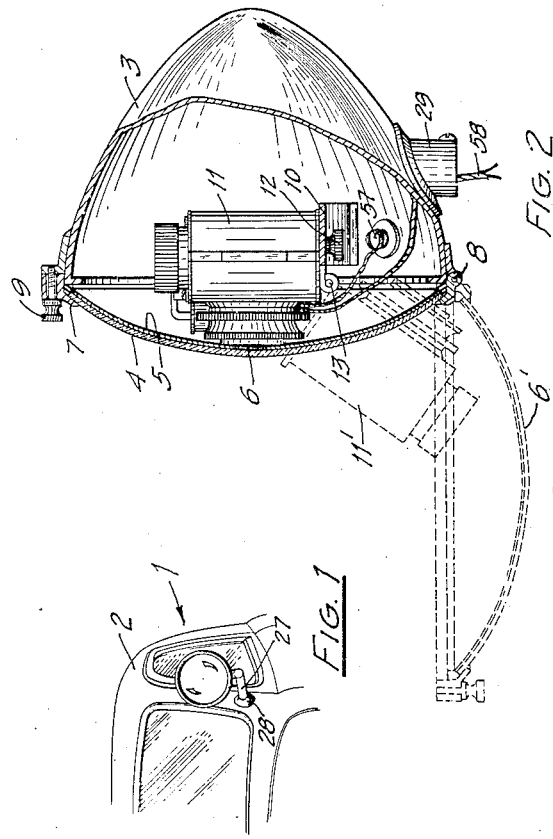
INVENTOR.
George C. Barker
BY
ATTORNEY March 8, 1949.  G. C. BARKER  2,464,067
CAMOUFLAGED CAMERA
Filed Aug. 16, 1944  2 Sheets-Sheet 2
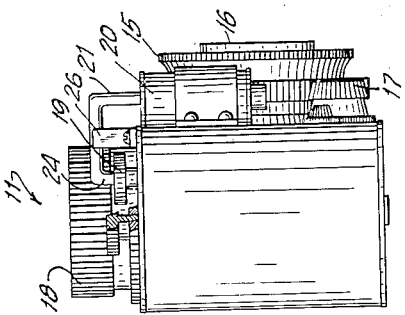
FIG. 7
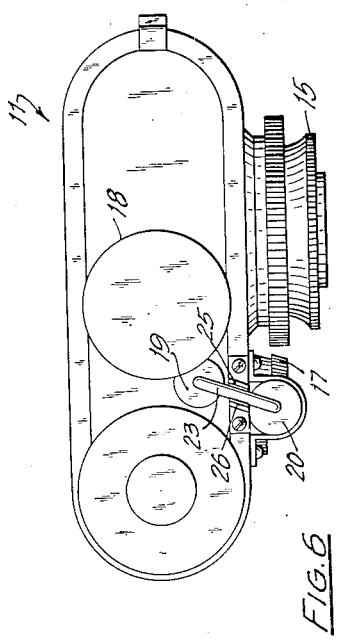
FIG. 6
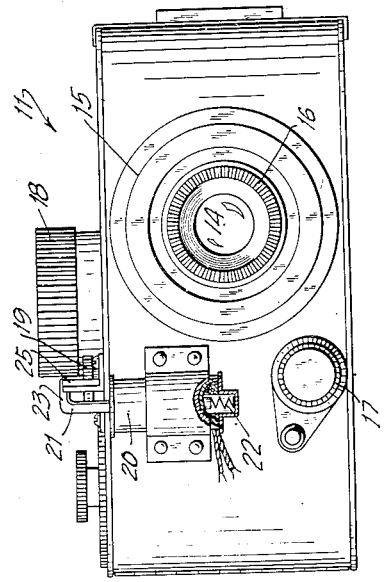
FIG. 5
INVENTOR.
George C. Barker
BY 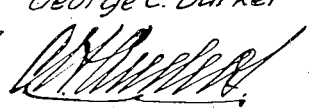
ATTORNEY Patented Mar. 8, 1949

2,464,067

UNITED STATES PATENT OFFICE 2,464,067

CAMOUFLAGED CAMERA

George C. Barker, Plattsburg, N. Y., assignor of one-half to Charles H. Andros, Nassau, N. Y.

Application August 16, 1944, Serial No. 549,684

6 Claims. (Cl. 95—11)

My invention relates to cameras and particularly to a novel means for concealing a camera comprising a casing or housing simulating in appearance an ordinary accessory, such as a spotlight, which is adapted for attachment to an automobile.

In the prosecution of crime it is frequently necessary or desirable for an investigator to take pictures of suspects and other subjects without the suspect or anyone else knowing that the pictures have been taken. Under the circumstances it is impossible either to pose the subject or to appear in picture-taking range of the subject with a camera that is visible.

The principal object of my invention, therefore, is to provide a camouflaged camera which, even when carefully inspected at close range appears to be an entirely different thing. Another object is to provide a camouflaged camera which is adapted for attachment to an automobile, which can be operated from the inside of the automobile to aim it and to trip the shutter and which even when closely examined will appear to be an ordinary spotlight. A further object is to provide a casing or housing simulating an automobile spotlight in appearance and within which a camera may be concealed.

With these objects in view my invention includes the novel elements and the combinations and arrangements thereof described below and illustrated in the accompanying drawings in which—

Fig. 1 is a fragmentary perspective view of an automobile showing my camera attached thereto;

Fig. 2 is a side elevation of the housing for the camera with certain parts broken away to show the positioning of the camera therein;

Fig. 3 is a front view of the camera housing with certain portions broken away;

Fig. 4 is a fragmentary longitudinal section of the housing secured to its support and showing a fragmentary portion of the handle for aiming the same;

Fig. 5 is a front elevation view of a camera and a shutter actuating means, with certain portions broken away, which is suitable for use in my device;

Fig. 6 is a top plan view of the camera; and

Fig. 7 is a left hand end view of the camera shown in Figs. 5 and 6 with certain portions thereof broken away.

Referring to the drawings—

1 generally represents the device as it would ordinarily be attached to the body 2 of an automobile. The housing for the camera comprises the parabolic casing 3 of an ordinary spotlight from which the reflector and light bulb have been removed, and which is equipped with a glass lens 4 in the front thereof. The lens 4 may be identical with the lens as used in the spotlight except that the inside surface thereof is coated with a silvery, light-reflecting substance 5 such as is used on mirrors. The inside of the lens is completely covered with the light-reflecting material except for a small circular area 6, which is in registration with the lens of the camera and which is left clear. The housing lens is secured in the bezel 7 which is preferably hinged to the bottom of the housing as shown at 8 so that, by loosening the nut 9 at the top, the bezel with the lens therein may be swung downwardly to the position 6' shown in the dotted lines in Fig. 2.

A shelf 10 to which the camera 11 is secured by means of the knurled nut 12, ordinarily used to attach the camera to a tripod, is hingedly supported within the casing on the pintle 13 so that it can be tipped forward as shown at 11' in Fig. 2 to provide access to the back of the camera for loading it with a roll of film. For purposes of illustration the camera which I have shown is the well known "Robot" which has proven very satisfactory, but it is to be understood that any small camera of the type in which a new film is automatically positioned in the focal plane after each shutter actuation may be employed. In the drawings, 14 is the lens which, in the type of camera illustrated, may be focused for various distances by turning the knurled ring 15. The shutter opening may be varied by turning the knurled ring 16 while the shutter speed may be regulated by turning the knurled knob 17. When the film is loaded into the camera the spring which actuates the shutter and automatically moves the film after each exposure is wound up by means of the knurled button 18 and, in order to take a picture, it is only necessary to depress the button 19 which trips the shutter and when released, automatically moves a new section of film into the focal plane behind the lens. In the "Robot" camera the focus may be set for any distance from 1 foot 9 inches to infinity and there is very little difference in the sharpness of the focus between a setting for 10 feet and a setting for infinity. Hence, I find that by setting the focus say at 20 feet very excellent pictures are taken throughout most distances. With a good lens the investigator can set the shutter opening and his shutter speed in accordance with the light expected to be encountered where the pictures are to be taken and the character of the subject matter involved. Thus, while the casing may be opened and the various adjustments quickly made it is not necessary, as a rule, to open the spotlight at frequent intervals to vary the adjustments.

In order to actuate or trip the shutter I provide an electromagnet 20 of the solenoid type which may be secured to the front of the camera and which has an armature 21 normally held partially out of the magnet by means of the helical spring 22. The armature at the top has an angularly disposed portion 23 having a downwardly extending extremity 24 which is positioned over the shutter actuating button 19. In order to maintain the armature in proper alignment with the button, guides 25 and 26 are provided on either side thereof. The housing 3 is rotatably secured to the tubular support 27 which is adapted to extend through a portion of the body of the automobile and be secured thereto by means 28 of the same type as is used to secure the spotlight. The camera housing and its support are preferably identical with these elements in an ordinary automobile spotlight, and means for aiming the camera and the means for tripping the shutter are identical, respectively, with the means for aiming the spotlight and for lighting the same. It is therefore to be understood that the showing in Fig. 4 of the drawing is merely illustrative of a support for the camera housing, a means for aiming the same, and a means for tripping the shutter, in order to make the disclosure complete.

Referring particularly to Figs. 2 and 4 a hollow tubular sleeve 29 is secured to the bottom of the housing 3 and the sleeve 30 is rotatably secured on the end of the tubular support; the sleeve 30 being prevented from separating from the support 27 by means of the screw 31 which engages an annular slot 32 in the support 27. The sleeve 30 is provided with an upwardly-extending, tubular projection 33 around which the sleeve 29 is rotatably fitted and prevented from separating therefrom by means of the screw 34 which engages the annular slot 35. Secured to the housing 3 within the sleeve 29 is a hollow shaft 36 having a bevel gear 37 secured to the bottom thereof by means of the set screw 38. A bearing washer 39 may be press fitted around the shaft 36 within the sleeve 29 and ride on the end of the upwardly projecting portion 33 of the sleeve 30. Mounted in bearings 40 and 41 within the support 27 is a shaft 42 having a bevel gear 43 on one end thereof which cooperates with the bevel gear 37, and a bevel gear 44 at the other end thereof which cooperates with a bevel gear 45 fixedly secured to and turnable with the stud 46 which is molded or otherwise fixed in the handle 47. The handle end of the support is surrounded by the sleeve 48 which is rotatable thereon and prevented from separating therefrom by means of the screw 49 which engages the annular slot 50 in the tube 27. The sleeve 48 is provided with a downwardly-extending, tubular portion 51 within which the handle 47 is rotatably mounted and prevented from separating therefrom by means of the screw 52 which engages the annular slot 53 in the handle. A bearing 54 for the stud 46 may be press fitted within the tubular portion 51. The ends of the support, including the sleeves are closed by the screw threaded caps 55 and 56.

From the foregoing it will be apparent that, by turning the handle 47, which is understood to be in the inside of the automobile, about the axis of the stud 46 the shaft 42 will be turned and will, in turn, rotate the shaft 36 secured to the camera housing. Thus the camera housing may be turned in any direction about the axis of the shaft 36 for aiming purposes. In addition, if the handle 47 and the sleeve 48 be rotated about the axis of the shaft 42 there will be no relative movement of the bevel gears which cooperate on each end of the shaft 42 and hence the housing 3 can be rotated in either direction about the axis of the shaft 42. Thus, movement of the housing 43 about a plurality of axes is provided so that the camera can be aimed in the same way that a spotlight can be focused on any desired point.

In order to trip the shutter of the camera from within the automobile, one terminal of the electromagnet 20 is grounded to the housing 3, as shown at 57 in Figs. 2 and 3, and the other terminal 58 extends downwardly through the hollow shaft 36, longitudinally through the support 27, as shown at 59, and is connected to the terminal 60 of the press button, represented generally at 61, all as shown in Fig. 4.

The terminal 60 is resilient and is of course insulated from the housing as shown. Below the terminal 60 is a second resilient terminal 62 which is also insulated from the housing and electrically connected to the terminal 63. A push button 64 when pressed upwardly will force the terminal 62 into contact with the terminal 60 thus completing an electrical circuit therethrough.

As is well understood, one terminal of the battery in an automobile is grounded. Thus, by connecting the terminal 63 with the live terminal of the battery, electrical energy is provided for actuating the electromagnet when the terminals 60 and 62 are pushed into contact by means of the button 64.

By silvering the inside of the housing lens 4, except in front of the camera lens 6, my camouflaged camera, even when viewed closely from the front, appears to be an ordinary spotlight. The silvered lens appears to be the parabolic reflector with which all spotlights are equipped, and thus it is practically impossible for anyone to detect the fact that the spotlight casing houses a camera instead of a spotlight.

While I have described my invention in its preferred embodiment it is to be understood that the words which I have used are words of description rather than of limitation and that changes within the purview of the appended claims may be made without departing from the true scope and spirit of my invention.

What I claim is:

1. The combination with a camera having a lens and shutter, of means for camouflaging the same comprising a housing enclosing said camera and simulating the appearance of an automobile spotlight including a lens, means for supporting said camera within said housing with the lens of said camera facing and closely adjacent the central zone of said housing lens, light reflecting means in said housing substantially coextensive with said housing lens except in front of said camera lens and positioned between said camera and said housing lens to conceal said camera, except the lens thereof, from view through said housing lens, and means exterior of and relatively remote from said housing for actuating the shutter of said camera.

2. The combination with a camera having a lens and shutter, of means for camouflaging the same comprising a housing enclosing said camera and simulating the appearance of an automobile spotlight including a lens, means for supporting said camera within said housing with the lens of said camera facing and closely adjacent the center of the lens of said housing, a light reflecting coating on the inner side of said housing lens except in front of said camera lens to conceal said camera, except the lens thereof, from view through said housing lens, electromagnetic means for actuating the shutter of said camera, and manually controlled means exterior of and relatively remote from said housing for energizing said electromagnetic means.

3. The combination with a camera having a lens and shutter, of means for camouflaging the same comprising a housing enclosing said camera and simulating the appearance of an automobile spotlight including a lens, means for supporting said camera within said housing with the lens of said camera facing and closely adjacent the lens of said housing, light reflecting means in said housing simulating, when viewed from the outside of said housing, the reflector of said spotlight and entirely concealing said camera except the lens thereof, from view through said housing lens, means for attaching said housing to the body of an automobile, means cooperating with said housing and adapted to extend into said body for effecting relative rotative movement of said housing and said attaching means about a plurality of axes whereby to direct said camera in various directions from inside said body, and means connected to said housing and accessible from inside said body for actuating said shutter.

4. The combination with a camera having a lens and shutter, of means for camouflaging the same comprising a housing enclosing said camera and simulating the appearance of an automobile spotlight including a lens, means for supporting said camera within said housing with the lens of said camera facing and closely adjacent the lens of said housing, a light reflecting coating on the inner side of said housing lens simulating, when viewed from the outside, the reflector of said spotlight and entirely concealing said camera, except the lens thereof, from view through said housing lens, a shaft housing secured to said camera housing, means for attaching said shaft housing to the body of an automobile with said shaft housing extending into said body, means including a shaft in said shaft housing cooperating with said camera housing for turning said camera housing about a plurality of axes, and means carried by said shaft housing for actuating the shutter of said camera from within said body.

5. The combination with a camera having a lens and shutter, of means for camouflaging the same comprising a housing for said camera simulating the appearance of an automobile spotlight and including a lens, hinged means secured to and supporting said camera within said housing with the lens of said camera closely adjacent the center of said housing lens and adapted, upon the removal of said housing lens, to swing out of said housing with said camera thereon to facilitate the loading of said camera, a silvery, light-reflecting means in said housing substantially coextensive with said housing lens, except in front of said camera lens, and entirely concealing said camera, except the lens thereof, from view through said housing lens, means for securing said housing to the body of an automobile, means cooperating with said housing and adapted to extend into the interior of said body when said housing is attached thereto for manually rotating said housing about a plurality of axes from inside said automobile, and an electromagnet in said housing for actuating said shutter from a point remote from said housing.

6. A housing adapted to conceal a camera and comprising a casing having the appearance of an automobile spotlight including a lens and a support for said casing adapted to extend through a portion of an automobile body; said lens having a coating of light reflecting metal on the inner side thereof and substantially coextensive therewith except in a small central zone thereof approximating in area the surface area of the lens of the camera to be concealed, and means in said casing for supporting a camera thereon with the lens of said camera adjacent and in registration with said central zone of said housing lens; whereby, said coating will conceal said camera, except the lens thereof, and, when viewed from the front, will appear to be the reflector in the spotlight.

GEORGE C. BARKER.

REFERENCES CITED

The following references are of record in the file of this patent:

UNITED STATES PATENTS

| Number | Name | Date |
|---|---|---|
| 349,133 | Anthony et al. | Sept. 14, 1886 |
| 362,492 | Clark | May 10, 1887 |
| 685,463 | Walkins | Oct. 29, 1901 |
| 1,277,592 | Horton et al. | Sept. 3, 1918 |
| 1,514,643 | Cardwell | Nov. 11, 1924 |
| 1,700,440 | Lord | Jan. 29, 1929 |
| 2,138,723 | Bell | Nov. 29, 1938 |
| 2,191,049 | Tornblom | Feb. 20, 1940 |
| 2,348,841 | Oswald | May 16, 1944 |